(12) United States Patent
Fujita

(10) Patent No.: US 6,795,219 B2
(45) Date of Patent: Sep. 21, 2004

(54) IMAGE READING DEVICE AND IMAGE FORMING APPARATUS EQUIPPED THEREWITH

(75) Inventor: Atsushi Fujita, Hachioji (JP)

(73) Assignee: Konica Corporation (JP)

( * ) Notice: Subject to any disclaimer, the term of this patent is extended or adjusted under 35 U.S.C. 154(b) by 639 days.

(21) Appl. No.: 09/832,592

(22) Filed: Apr. 11, 2001

(65) Prior Publication Data

US 2001/0030772 A1 Oct. 18, 2001

(30) Foreign Application Priority Data

Apr. 17, 2000 (JP) ........................................ 2000-115048

(51) Int. Cl.$^7$ ................................................. H04N 1/04
(52) U.S. Cl. ...................... 358/496; 358/497; 358/498; 358/474; 358/471; 399/98
(58) Field of Search ................................ 358/496, 497, 358/498, 474, 471, 482, 483, 401, 400, 501, 505, 500, 512, 514, 513; 382/312, 318, 319; 250/208.1, 234–236; 399/211, 98, 364, 367, 379, 377, 345, 351

(56) References Cited

U.S. PATENT DOCUMENTS 5,081,497 A * 1/1992 Agarwal et al. ............. 399/379
5,812,172 A * 9/1998 Yamada ....................... 347/171

FOREIGN PATENT DOCUMENTS

JP 2003-307794 * 10/2003 ............ H04N/1/00

* cited by examiner

Primary Examiner—Cheukfan Lee
(74) Attorney, Agent, or Firm—Muserlian, Lucas and Mercanti

(57) ABSTRACT

In an image reading device having the reading function of a moving original exposure type to read an original document which is moving on the surface of a glass plate for slit exposure by an exposure unit standing still at a specified position under the glass plate for slit exposure, and the reading function of a moving optical system exposure type to read an image of an original document placed on a document base glass plate by moving the exposure unit under the document base glass plate, there is provided a cleaning device for cleaning the rear side of the glass plate for slit exposure.

10 Claims, 8 Drawing Sheets

IMAGE READING DEVICE AND IMAGE FORMING APPARATUS EQUIPPED THEREWITH

BACKGROUND OF THE INVENTION

This invention relates to an image reading device having the reading function of a moving document exposure type (sheet-through reading) to read an image of an original document which is moving on the surface of a glass plate for slit exposure and the reading function of a moving optical system exposure type (flat-bed type) to read an image of an original document placed on a document base glass plate by moving an exposure unit under the document base glass plate, an image forming apparatus equipped with said image reading device such as an electrophotographic copying machine, a printer, a facsimile machine, and an image forming apparatus having a multiplex function.

With respect to a conventional image reading device having both of the reading function of a moving original exposure type and the reading function of a moving optical system exposure type, one that is noted in the publication of the unexamined patent application H3-23137 can be cited.

This image reading device is capable of image reading of two types, that is, a moving original exposure type in which an original document sheet is separated from a bundle of document sheets to be conveyed onto the surface of a glass plate for slit exposure by an automatic document feeder of a sheet-through reading type, which is attached to the upper side of the image reading device, and the document sheet moving on said glass plate for slit exposure is read by an optical system standing still under said glass plate for slit exposure, and a moving optical system exposure type in which an original document sheet is placed on a document base glass plate with the automatic document feeder opened, and the document sheet is read by moving an exposure unit.

In an image forming apparatus such as a copying machine equipped with an automatic document feeder of the above-mentioned sheet-through reading type, if an alien substance adheres to a position in the neighborhood of the optical axis on the rear surface of the glass plate for slit exposure, a white streak image or a black streak image is produced on a recording paper sheet on which an image is formed.

Because it is difficult to let a user practice the cleaning of the glass plate for slit exposure by removing smudges on the rear surface of it, a service for maintenance should be requested to a trader concerned having a specialized technique (serviceman call).

SUMMARY OF THE INVENTION

It is an object of this invention, in order to solve the above-mentioned problem, to provide an image reading device and an image forming apparatus provided with a cleaning means having an extended durability of a cleaning member to the utmost extent and preventing the re-adhering of an alien substance after cleaning, by cleaning only the portion near the optical axis on the rear surface of the glass plate for slit exposure.

(1) An image reading device of this invention to accomplish the above-mentioned object is an image reading device having the reading function of a moving original exposure type to read an original document which is moving on the surface of a glass plate for slit exposure by an exposure unit standing still at a specified position under said glass plate for slit exposure, and the reading function of a moving optical system exposure type to read an image of an original document placed on a document base glass plate by moving an exposure unit under said document base glass plate, wherein cleaning means for cleaning the rear side of said glass plate for slit exposure is provided.

(2) An image forming apparatus of this invention to accomplish the above-mentioned object is equipped with an image reading device as set forth in the above-mentioned paragraph (1), and image forming means for forming an electrostatic latent image on an image carrying member by image exposure means on the basis of an image signal of an original document obtained by said image reading device, and visualizing said electrostatic latent image.

DETAILED DESCRIPTION OF THE PREFERRED EMBODIMENT

In the following, an image reading device of this invention and an image forming apparatus equipped with the image reading device will be explained on the basis of the attached drawings.

Figure 1:
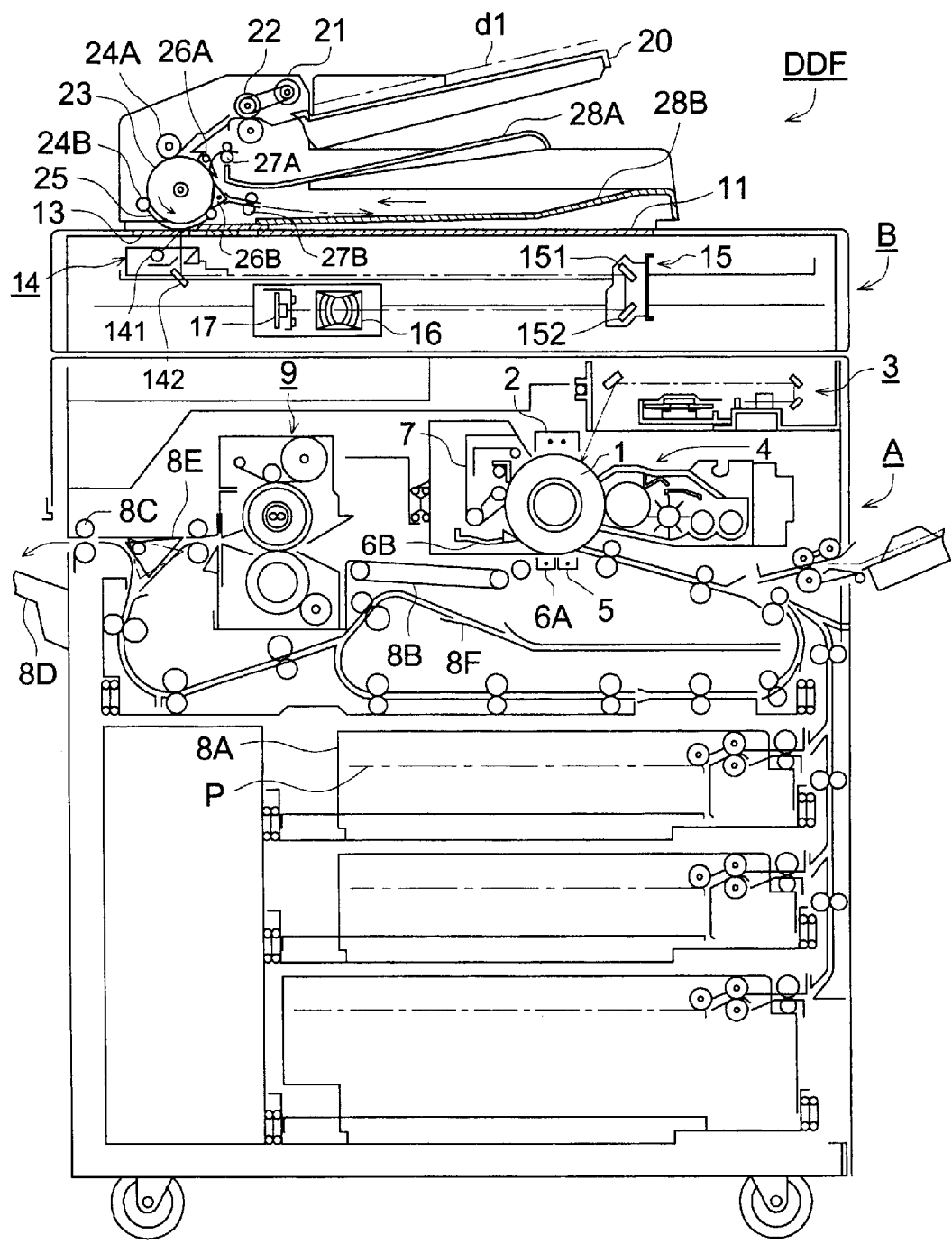
FIG. 1 is a drawing showing the overall structure of an image forming apparatus composed of the image forming apparatus mainframe, an image reading device, and an automatic document feeder.

FIG. 1 is a drawing showing the overall structure of an image forming apparatus composed of the image forming apparatus mainframe, an image reading device, and an automatic document feeder.

The image forming apparatus mainframe A comprises the charging means 2, the image exposure means (writing means) 3, the developing means 5, the charge eliminating means 6A, the pick-off finger 6B, and the cleaning means 7, which are all arranged around the rotary image carrying member (hereinafter referred to as the photoreceptor) 1, and after carrying out uniform charging on the surface of the photoreceptor 1 by the charging means 2, forms an electrostatic latent image through carrying out the beam scanning in accordance with the image data obtained by reading an original document by the laser beam of the image exposure means 3, to form a toner image on the surface of the photoreceptor 1 by reverse-developing said electrostatic latent image by the developing means 4.

On the other hand, the transfer paper sheet P fed from the transfer paper containing means 8A is conveyed to the transfer position. At the transfer position, the aforesaid toner image is transferred onto the transfer paper sheet P by the transfer means 5. After that, the transfer paper sheet P has its charge on the rear side eliminated by the charge eliminating means 6A, is detached from the photoreceptor 1 by the pick-off finger 6B, is conveyed by the intermediate conveyance portion 8B, is next heated by the fixing means to fuse the toner image, and is ejected onto the ejected paper tray 8D by the paper ejecting means 8C.

On the other hand, from the surface of the photoreceptor 1 after the processing for image formation, the toner particles remaining on it is removed by the cleaning means 7 at the downstream side of the pick-off finger 6B, and the photoreceptor is ready for the next image formation.

On the upper side of the image forming apparatus mainframe A, the automatic document feeder DDF of a sheet-through reading type is supported in such a manner as to be capable of being opened and closed.

In the automatic document feeder DDF, 20 denotes the document feeding base, 21 denotes the feed roller, 22 denotes the separation roller, 23 denotes the conveyance drum, 24A and 24B denote the pinch rollers respectively, 25 denotes the document guide member, 26A and 26B denote the conveyance path switching plates respectively, 27A and 27B denote the pairs of paper ejection rollers, and 28A and 28B denote the ejected paper trays respectively. The automatic document feeder DDF has the function of reading a single-sided document and the function of reading a double-sided document.

A document sheet d1, which is placed on the document feeding base 20 with its image side directed upward, is fed by the feed roller 21 and the separation roller 22, is gripped between the rotating conveyance drum 23 and the pinch rollers 24A and 24B, is guided by the document guide member 25, and passes over the glass plate for slit exposure 13.

The exposure unit 14 (to be described later) standing still at the initial position (home position) under the glass plate for slit exposure 13 illuminates the document sheet d1 passing over the surface of the glass plate for slit exposure 13, and the image of the document is read by the optical system.

In the case where only one side of the document is read, a large-sized document sheet d1, which has been subjected to the exposure process on the glass plate for slit exposure 13 is gripped by the paper ejection rollers 27A and is ejected onto the ejected paper tray 28A. A small-sized document sheet d1 is gripped by the paper ejection rollers 27B and is ejected onto the ejected paper tray 28B.

In the case where both sides of the document are read, first, the document sheet d1 of which one side has been processed is ejected onto the ejected paper tray 27B as it is gripped by the paper ejection rollers 27B. After that, by reversely rotating the paper ejection rollers 27B, the document sheet d1 is switched back to be reversed upside down, is again gripped between the rotating conveyance drum 23 and the pinch rollers 24A and 24B, is guided by the document guide member 25, and is made to pass over the glass plate for slit exposure 13. While it passes over the glass plate for slit exposure 13, the exposure unit 14 illuminates the rear side of the document sheet d1, and the optical system reads the rear side image of the document sheet d1.

A double-sided document sheet, for which the reading of the rear side image has been finished, in the same way as a single-sided document sheet, is ejected onto the ejected paper tray 28A or the ejected paper tray 28B. The conveyance path switching plates 26A and 26B disposed in the neighborhood of the outer circumference of the conveyance drum 23 switches over the ejection/reversing path of the document sheet d1.

As for the reading of a document by the automatic document feeder DDF, there are the above-mentioned sheet-through reading function to read a document moving on the glass plate for slit exposure, and the reading function of a moving optical system type for a stopped document to read a document placed on the document base glass plate 11 while the exposure unit 14 and the V-mirror unit 15 are being moved.

The optical system of the image reading device B is composed of the exposure unit 14 provided with the light source 141 and the first mirror 142, the V-mirror unit 15 composed of the second mirror 151 and the third mirror 152, the lens 16, and the CCD image sensor 17.

The image reading device B has two modes, that is, the moving document exposure mode in which a document d1 moving on the surface of the glass plate for slit exposure 13 is read, and the moving optical system exposure mode in which a document d2 placed on the document base glass plate 11 is read by moving the exposure unit, and is capable of carrying out the both exposure processes by means of a single exposure unit.

The reading of the document sheet d1 by the automatic document feeder DDF is carried out with the exposure unit stopped at the initial position (home position) under the glass plate for slit exposure 13. The reading of the document sheet d2 placed on the document base glass plate 11 is carried out as the optical system unit composed of the exposure unit 14 and the V-mirror unit 15 are being moved.

Figure 2:
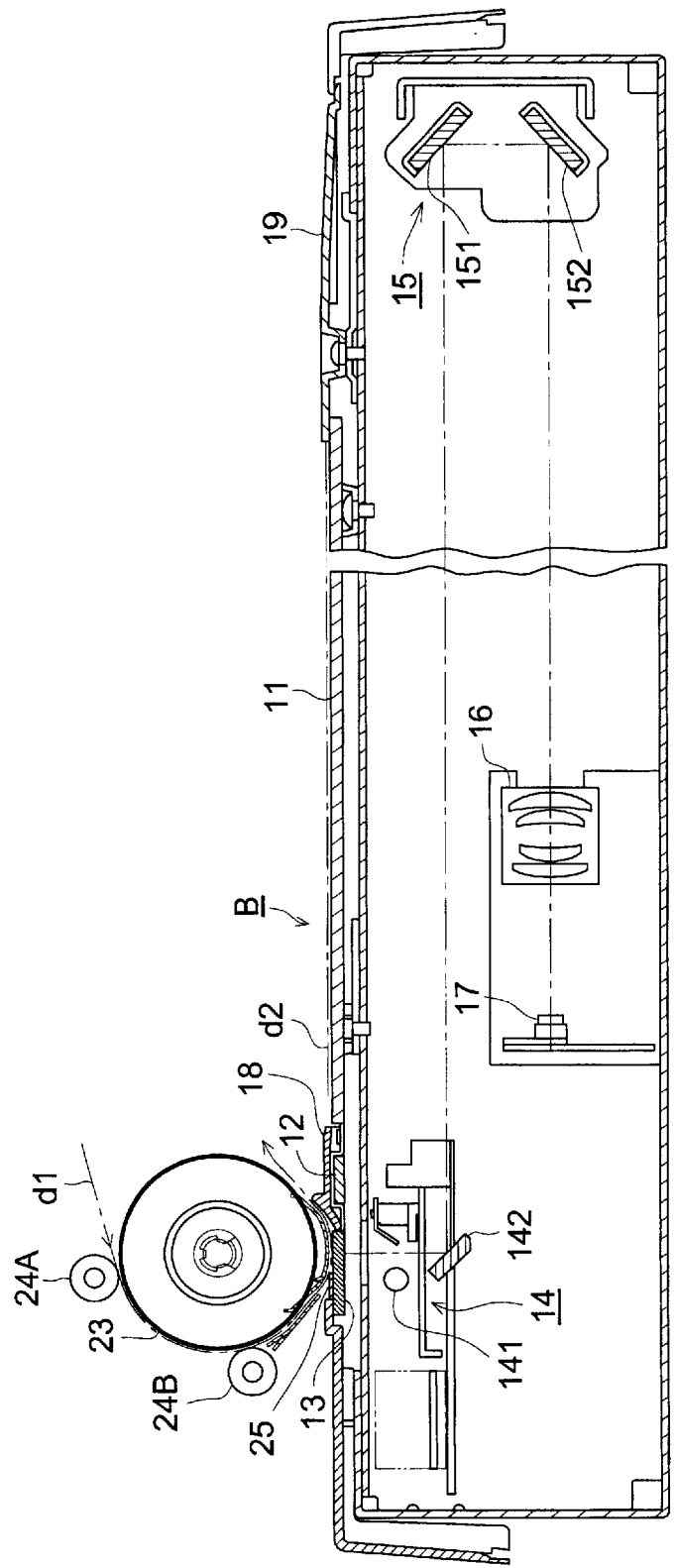
FIG. 2 is a cross-sectional view of an image reading device.
Figure 3:
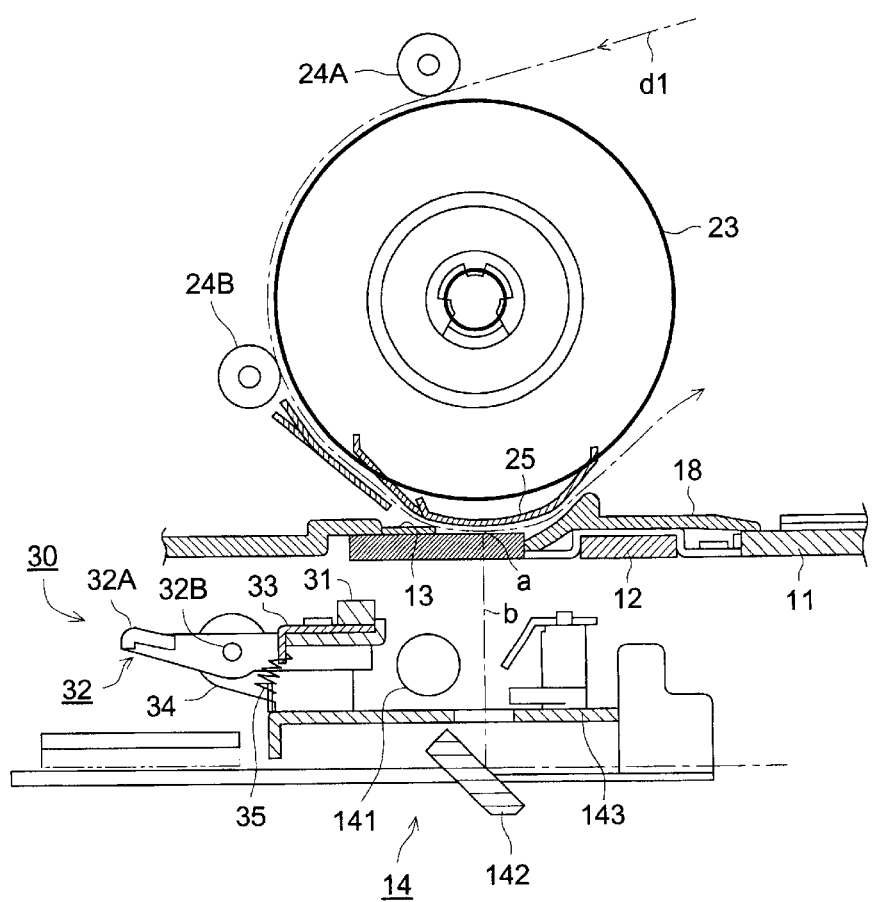
FIG. 3 is an enlarged partial cross-sectional view of an image reading device.

FIG. 2 is a cross-sectional view of an image reading device, and FIG. 3 is an enlarged partial cross-sectional view of an image reading device.

At the upper side of the image reading device B, the document base glass plate 11, the standard plate for shading correction 12, the glass plate for slit exposure 13, the cover member 18, and the document stopping basis member 19 are arranged.

At the downstream side of the glass plate for slit exposure 13 in the document conveying direction, the cover member 18, which covers the standard member for shading correction 12 and is used also as the document conveyance guide member, and others are fixed to the upper surface of the image forming apparatus mainframe A. In the neighborhood of the right side end portion shown in the drawing parallel to the shorter side of the document base glass plate 11, the document stopping basis plate 19 for positioning the right side edge of a document sheet d2 is fixed.

With respect to a document sheet d1, which is gripped and conveyed by the drive-rotating conveyance drum 23 and the driven-rotating pinch rollers 24A and 24B in the automatic document feeder DDF, the original image is read through the exposure unit in the still-standing state at the specified reading position "a" on the glass plate for slit exposure 13, "b" indicates the perpendicular optical axis of the first mirror 142.

The document sheet d1 conveyed by the conveyance drum 23 passes the gap formed between the upper surface of the glass plate for slit exposure 13 and the lower surface of the document guide member 25, and is conveyed along the upper surface of the cover member 18.

On the upper surface of the moving base 143 of the exposure unit 14 provided with the light source 141 and the mirror 142, the cleaning means 30 for cleaning the rear side of the glass plate for slit exposure 13 is arranged.

The cleaning means 30 is composed of the cleaning member for cleaning the rear side of the glass plate for slit exposure 13 in sliding contact with it, the oscillating member 32 for holding the cleaning member 31 supported in a way capable of oscillating, the reinforcement member 33 for preventing the deformation of the oscillating member 32, the fixing member 34 for supporting the oscillating member 32 in a way capable of oscillating and fixing it on the upper surface of the moving base 143, and the urging member 35 for urging the oscillating member 32. The urging member 35 is desirably made up of an elastic member such as a spring.

The oscillating member 32 is urged by the urging member 35 in one direction, and the both end portions of the oscillating member 32 are in contact with the both side surface portions of the fixing member 34, to be held in the still-standing state.

Figure 4:
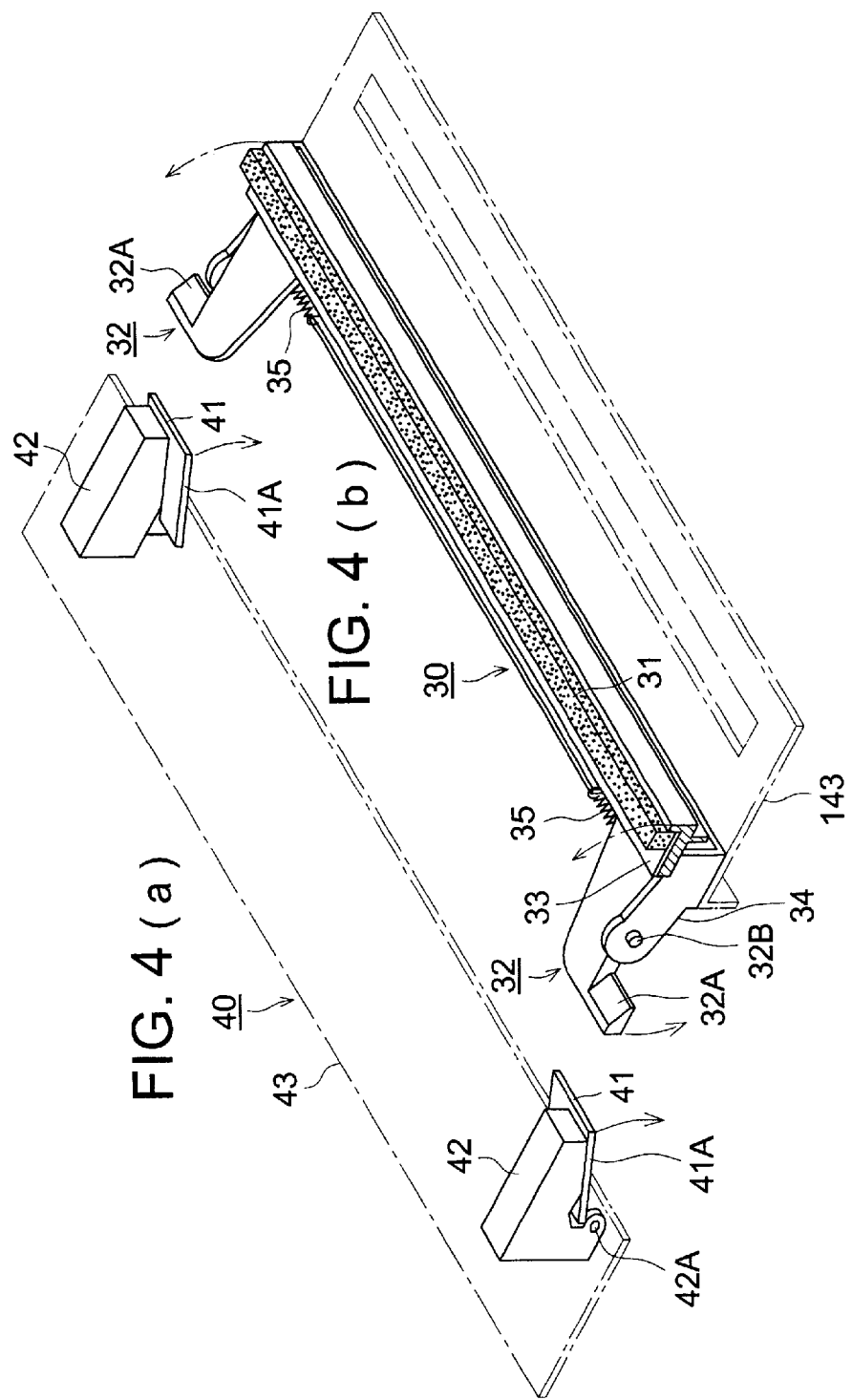
FIG. 4(a) and FIG. 4(b) are perspective views showing a cleaning member driving means and a cleaning means respectively.
Figure 5:
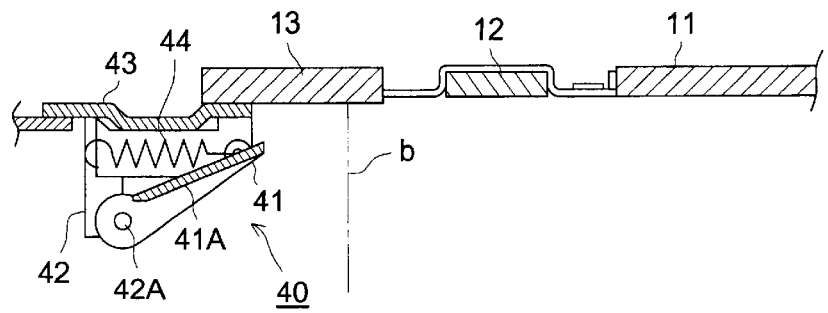
FIG. 5(a) to FIG. 5(d) are cross-sectional views showing the stopping state and the oscillating state of a cleaning member driving means and the stopping state and the oscillating state of a cleaning means respectively.
Figure 5:
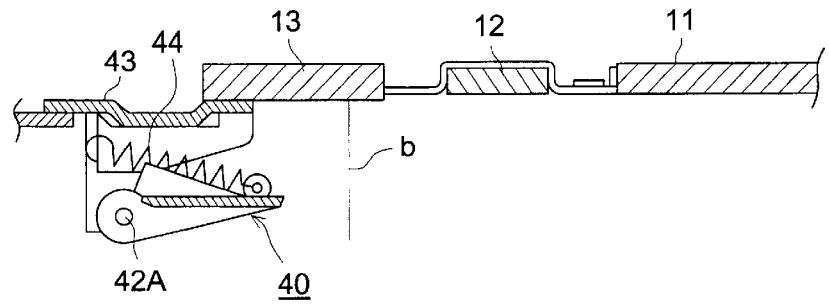
Figure 5:
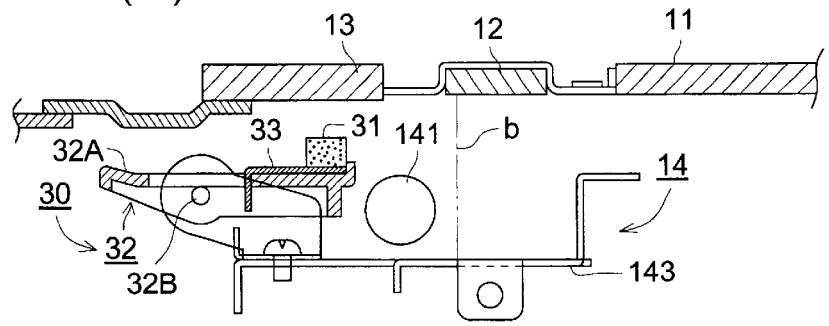
Figure 5:
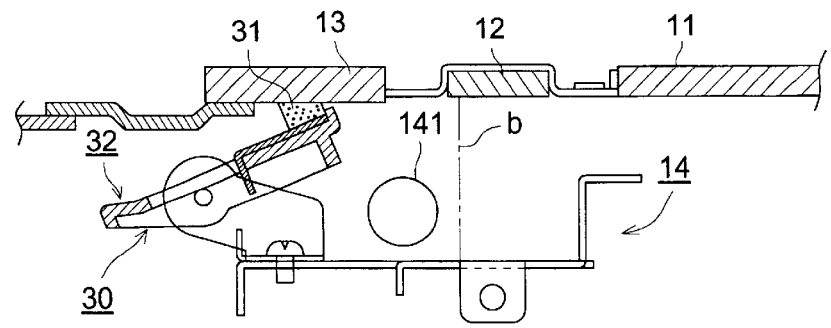
Figure 6:
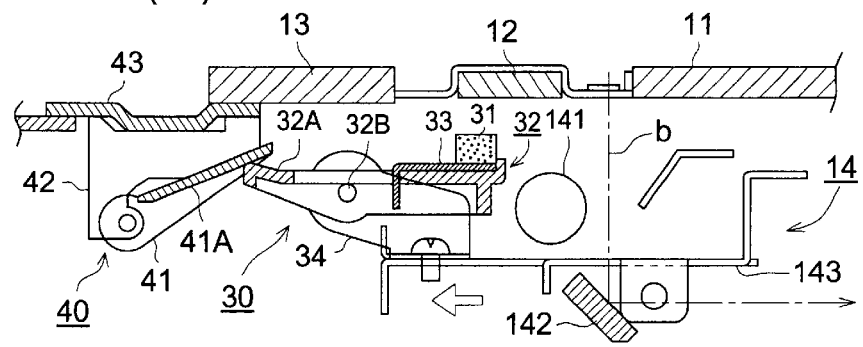
FIG. 6(a) to FIG. 6(h) are drawings showing the process of operation of a cleaning means and a cleaning member driving means.
Figure 6:
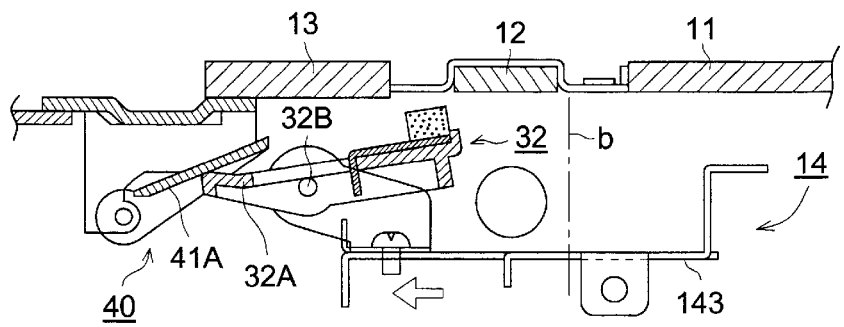
Figure 6:
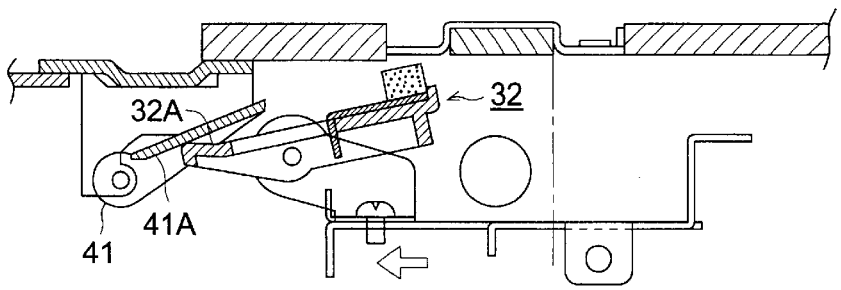
Figure 6:
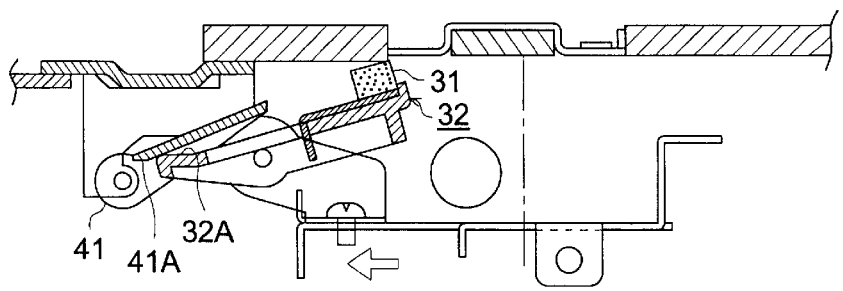
Figure 6:
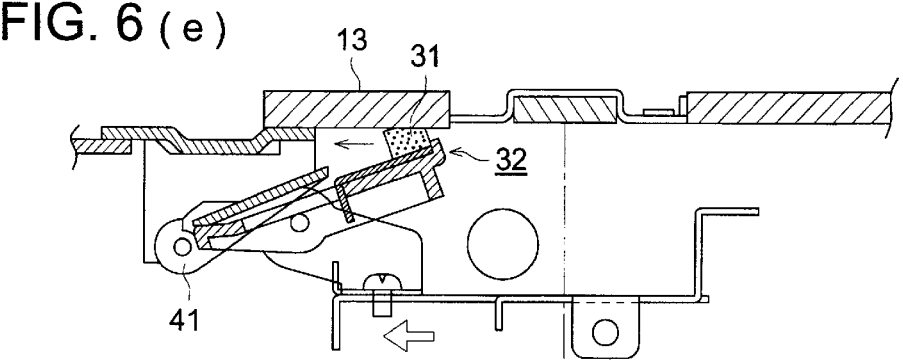
Figure 6:
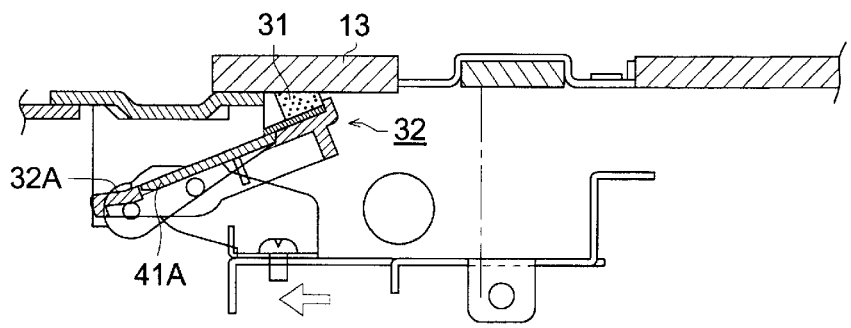
Figure 6:
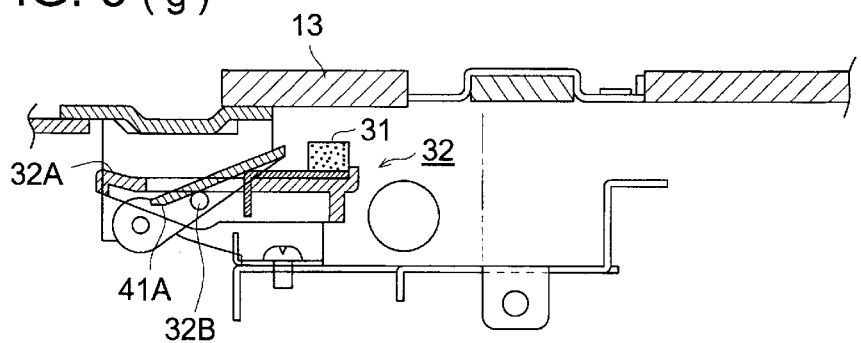
Figure 6:
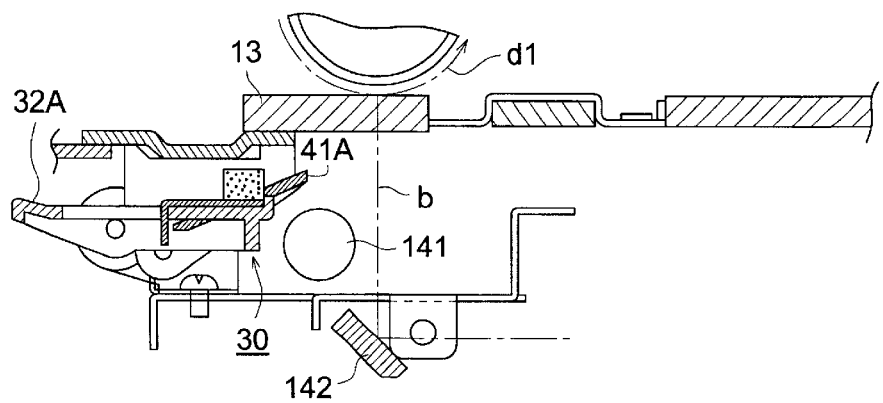

FIG. 4(a) is a perspective view of the cleaning member driving means 40 for driving the oscillating member 32 of the cleaning means 30 in a way capable of oscillating, and FIG. 4(b) is a perspective view of the cleaning means 30. FIG. 5(a) is a cross-sectional view showing the still-standing state of the cleaning member driving means 40, and FIG. 5(b) is a cross-sectional view showing the oscillating state of the cleaning member driving means 40. FIG. 5(c) is a cross-sectional view showing the still-standing state of the cleaning means 30, and FIG. 5(d) is a cross-sectional view showing the oscillating state of the cleaning means 30.

At the both end portions of the base plate 43, which is fixed to the main body of the image reading device B, the fixing members 42 are fixed. The projecting axis portion of the fixed member 42 is fitted into the hole portion of the pressing member 41, which is supported by the fixing member 42 in a way capable of oscillating. The pressing member 41 is urged by the spring member 44, and is brought into contact with a part of the fixing member 42, to be held in the still-standing state.

In the pressing member 41, there is provided the tilt cam portion 41A as a cam portion having an integrally formed tilted surface, and said tilt cam portion 41A is capable of engaging with and disengaging from the cam engaging portion 32A formed in the oscillating member 32 of the cleaning means 30.

To the moving base 143 of the exposure unit 14, the fixing member 34 as a supporting member is fixed. In the hole portions bored at the both end portions of the fixing member 34 respectively, the projection portions 32B of the oscillating member 32 are fitted respectively, to support the oscillating member 32 in a way capable of oscillating.

Near the one end portion (right side in the drawing) of the oscillating member 32, the cleaning member 31 is fixed through the reinforcement member 33. The cleaning member 31 and the reinforcement member 33 are bound together integrally by an adhesive, and the reinforcement member 33 is mounted on the mounting surface for the cleaning member 31 in a replaceable manner. The oscillating member 32 is formed of a resin by molding, and is easy to deform because it is of a shape having a thin long span portion. The reinforcement member 33 made of a metal is integrated with the thin long span portion to reinforce it, in order to prevent the deformation of the oscillating member 32.

For the cleaning member 31, a foamed rubber material having elasticity, for example, an urethane rubber, an ethylene-propylene rubber (EPDM), or the like is desirably used.

Near the other end portion (left side in the drawing) of the oscillating member 32, the arm portions 32C provided at two positions project, and at each front end portion of them, the cam engaging portion 32A is integrally formed.

Figure 7:
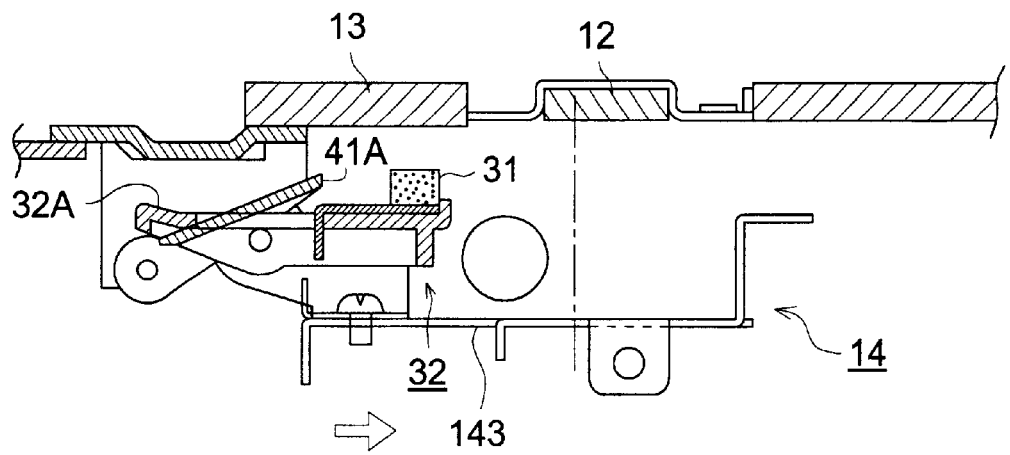
FIG. 7(a) and FIG. 7(b) are cross-sectional views showing the process of operation of a cleaning means and a cleaning member driving means.
Figure 7:
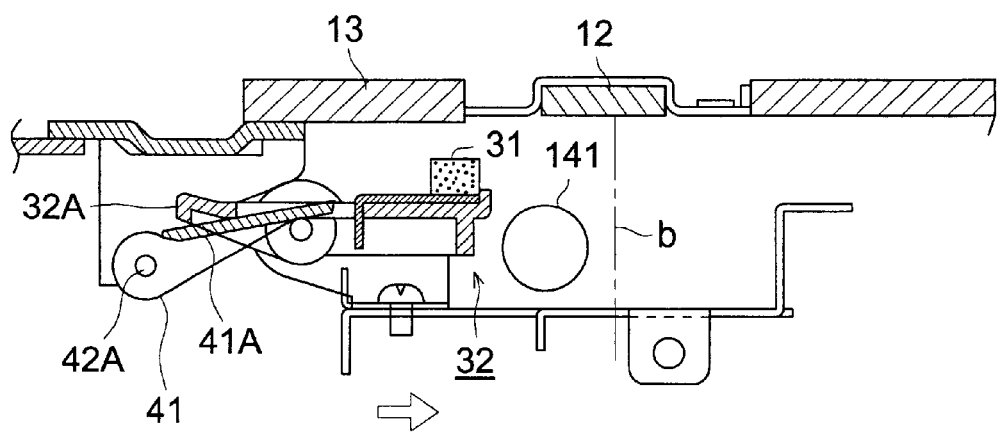

FIG. 6(a) to FIG. 7(b) are cross-sectional views showing the process of operation of the cleaning means 30 and the cleaning member driving means 40. FIG. 6(a) to FIG. 6(h) show the operation of the cleaning means 30 and the cleaning member driving means 40 in the returning movement process of the exposure unit. FIG. 7(a) and FIG. 7(b) show the operation of the cleaning means 30 and the cleaning member driving means 40 in the going movement process of the exposure unit.

The cleaning by the cleaning means 30 is carried out at least any one timing out of the timing of the scanning for the adjustment process at the time of turning-on of the power source of the apparatus, the timing of the scanning for shading correction, and the timing of returning movement of the exposure unit. In the following, the cleaning process by the cleaning means 30 will be explained.

(1) In the movement process (in the direction of the void arrow mark) of the exposure unit 14 returning to the initial position, the cam engaging portion 32A of the oscillating member 32 supported by the fixing member 34 fixed to the moving base 143 is brought into contact with the lower surface of the tilt cam portion 41A of the pressing member 41 supported by the fixing member 42 of the cleaning member driving means 40 (refer to FIG. 6(b)).

(2) When the exposure unit 14 progresses further to the direction of the arrow mark, the cam engaging portion 32A of the oscillating member 32 moves sliding along the tilt cam portion 41A of the pressing member 41 set at the fixed position, and the oscillating member 32 is oscillated around the projecting axis portion 32B (refer to FIG. 6(b)).

(3) When the exposure unit 14 further progresses to the direction of the arrow mark, the cam engaging portion 32A of the oscillating member 32 further goes down along the tilt cam portion 41A, and the oscillating member 32 is further oscillated around the projecting axis portion 32B (refer to FIG. 6(c)).

(4) When the exposure unit 14 further progresses to the direction of the arrow mark, the oscillating member 32 further oscillates, to bring the upper surface of the cleaning member 31 into contact with the lower surface of the glass plate for slit exposure 13 (refer to FIG. 6(d)).

(5) By the continued movement of the exposure unit 14, the oscillating member 32 further oscillates; the upper surface of the cleaning member presses the lower surface of the glass plate for slit exposure 13, and it moves to the direction of the arrow mark with the movement of the moving base 143, to start cleaning the lower surface of the glass plate for slit exposure 13 (refer to FIG. 6(e)).

(6) By the continued movement of the exposure unit 14, until the engagement of the cam engaging portion 32A of the oscillating member 32 with the tilt cam portion 41A of the pressing member 41 is released, the moving cleaning by the cleaning member 31 for the glass plate for slit exposure 13 is carried out (refer to FIG. 6(f)). This moving cleaning by the cleaning member 31 is carried out preponderantly only for the portion near the exposure optical path of the glass plate for slit exposure 13. The distance of the moving cleaning is 5 to 15 mm and more preferably about 10 mm. Owing to this, only the small portion necessary for image exposure is effectively cleaned; therefore, it can be prevented that the cleaning member is smudged and its durability is decreased, for example.

Further, the linear cleaning velocity for the glass plate for slit exposure 13 by the cleaning means 30 is set at a lower value than the linear velocity in the scanning exposure by the first mirror 142. For example, assuming that the linear velocity of the exposure unit 14 is 370 mm/sec, when a document sheet d2 is placed on the document base glass plate 11, and the original image is subjected to the scanning exposure by the movement of the exposure unit, in the case where the scanning exposure is carried out from the right side to the left side in the drawing for the document sheet d2 placed on the document base glass plate 11 shown in FIG. 2, the exposure unit 14 including the cleaning member 31 is decelerated to 70 mm/sec immediately before the cleaning, and the cleaning member 31 at this low speed is brought into sliding contact with the glass plate for slit exposure 13. Owing to this low-speed cleaning, the cleaning of the glass plate for slit exposure 13 is made reliable, and also the durability of the cleaning member is improved.

(7) When the engagement of the cam engaging portion 32A of the oscillating member 32 with the tilt cam portion 41A of the pressing member 41 is released, the oscillating member 32 is urged by the urging member 35 (refer to FIGS. 4(a) and 4(b)), and returns to the approximately horizontal initial position shown in FIG. 6(a), while the cleaning member 31 is detached from the lower surface of the glass plate for slit exposure 13, and the cleaning is finished (refer to FIG. 6(g)).

(8) The exposure unit further moves until it reaches the specified position completely deviated from the perpendicular optical axis "b" of the first mirror, where it is stopped. At this specified position, the image of a conveyed document d1 is read by the image reading device B (refer to FIG. 6(h)).

(9) When an image exposure or a shading correction exposure is started, the exposure unit 14 starts moving from the initial position, and the cam engaging portion 32A of the oscillating member 32 is brought into contact with the upper surface side of the tilt cam portion 41A of the pressing member 41 (refer to FIG. 7(a)).

(10) When the exposure unit 14 horizontally moves to the direction of the void arrow mark, the lower surface of the cam engaging portion 32A of the moving oscillating member 32 is pressed to the upper surface side of the tilt cam portion 41A of the pressing member 41. Because the oscillating member 32 is urged by the urging member 35 and engages with the both side wall portions of the fixing member 34, the straight progressing of the oscillating member 32 retracts the pressing member 41 against the urging by the spring member 44 (refer to FIG. 5(b)) through the oscillation around the projecting axis portion 42A, which enables the straight progressing of the oscillating member 32. FIG. 7(b) shows the state of the perpendicular optical axis "b" of the first mirror 142 reaching the light measurement position of the shading correction standard plate 12. At the time of movement to this light measurement position, the cleaning member 31 is detached from the glass plate for slit exposure 13. In the returning process after shading correction, the cleaning operation shown in FIG. 6(a) to FIG. 6(f) is carried out.

As explained in the foregoing, according to an image reading device and an image forming apparatus of this invention, the following effects can be obtained.

(1) In an image forming apparatus such as a copying machine equipped with an automatic document feeder of a sheet-through reading type, by cleaning only the portion near the optical axis on the rear surface of the glass plate for slit exposure, the durability of the cleaning member can be extended to the utmost, and it can be prevented that an alien substance adheres again to the glass plate for slit exposure after cleaning.

(2) For an image forming apparatus which is equipped with an image reading device and forms an image read by said image reading device on a recording material, in any one of the case of the moving document exposure mode and the case of the moving optical system mode, by an image reading device which does not cause the image forming apparatus to produce a white streak image or a black streak image on a transfer paper sheet having an image formed, a high-quality image is formed on the transfer paper sheet.

What is claimed is:
1. An image reading device comprising:
   (a) a first platen glass for a slit exposure;
   (b) a second platen glass for a scanning exposure;
   (c) an exposure unit for exposing either an original which moves along a front surface of the first platen glass while the exposure unit is stopped at a predetermined position below the first platen glass to read an image of the original or the original which is placed on a front surface of the second platen glass while the exposure unit moves below the second platen glass to read the image of the original; and
   (d) a cleaning device for cleaning a back surface of the first platen glass which faces the exposure unit.

2. The image reading device of claim 1, wherein the cleaning device comprises:
   a cleaning member being in slidably contact with the back surface of the first platen glass; and
   a rocking member rotatably supported on the exposure unit for holding the cleaning member.

3. The image reading device of claim 2, wherein the cleaning member is replaceably mounted to the rocking member.

4. The image reading device of claim 1, further comprising a driving mechanism for driving the cleaning device.

5. The image reading device of claim 4, wherein the driving mechanism operates the cleaning device so as to clean only vicinity of an exposure optical path of the first platen glass.

6. The image reading device of claim 4, wherein the cleaning device comprises:
   a cleaning member being in slidably contact with the back surface of the first platen glass; and
   a rocking member rotatably supported on the exposure unit for holding the cleaning member,
   wherein the driving mechanism is disposed stationary to the image reading device, and comprises a cam section which is in contact with one end of the rocking member for rocking the rocking member, and
   wherein when the exposure unit moves, the cam section is in contact with the one end of the rocking member, and makes the rocking member to be rocked, thereby the cleaning member is in slidably contact with the back surface of the first platen glass.

7. The image reading device of claim 1, wherein when the exposure unit moves, the cleaning device cleans the back surface of the first platen glass.

8. The image reading device of claim 7, wherein movement of the exposure unit is conducted at any one of a timing of a adjusting process when electric power is applied, a timing of a shading correction, and a timing of returning movement of the exposure unit.

9. The image reading device of claim 1, wherein a cleaning line speed of the cleaning member is slower than a moving line speed of the exposure unit during an exposure of the exposure unit.

10. An image forming apparatus comprising:
   (a) the image reading device according to claim 1;
   (b) an image carrying body on which a latent image is formed;
   (c) an imagewise exposure means for forming an electrostatic latent image on the image carrying body according to the image read by the image reading device; and
   (d) a developing means for developing the electrostatic latent image.

* * * * *